(12) United States Patent
Inukai (10) Patent No.: US 11,381,732 B2
(45) Date of Patent: Jul. 5, 2022

(54) IMAGE-CAPTURING CONTROLLER AND METHOD FOR CONTROLLING SAME

(71) Applicant: CANON KABUSHIKI KAISHA, Tokyo (JP)

(72) Inventor: Hiroaki Inukai, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/205,619

(22) Filed: Mar. 18, 2021

(65) Prior Publication Data

US 2021/0306568 A1 Sep. 30, 2021

(30) Foreign Application Priority Data

Mar. 25, 2020 (JP) .............................. JP2020-054556

(51) Int. Cl.
*H04N 5/232* (2006.01)
*G06F 3/01* (2006.01)

(52) U.S. Cl.
CPC . *H04N 5/232127* (2018.08); *H04N 5/232939* (2018.08); *G06F 3/013* (2013.01)

(58) Field of Classification Search
CPC ....... H04N 5/232127; H04N 5/232939; H04N 5/232945; H04N 5/232; H04N 5/225; G06F 3/013; G02B 27/28; G03B 13/02
USPC ........................................................ 348/346
See application file for complete search history.

(56) References Cited

U.S. PATENT DOCUMENTS

| | | | | |
|---|---|---|---|---|
| 6,191,819 B1 * | 2/2001 | Nakano | ............ | H04N 5/232945 348/333.03 |
| 6,388,707 B1 * | 5/2002 | Suda | ................ | H04N 5/232123 348/333.03 |
| 6,456,788 B1 * | 9/2002 | Otani | ..................... | G03B 13/02 396/51 |
| 9,285,655 B2 * | 3/2016 | Shibuno | ................... | G02B 7/36 |
| 10,567,641 B1 * | 2/2020 | Rueckner | ........... | H04N 5/23218 |
| 10,664,991 B2 * | 5/2020 | Sugimoto | ................. | G06T 7/74 |
| 10,992,853 B2 * | 4/2021 | Ogawa | ............. | H04N 5/232941 |
| 2002/0057908 A1 * | 5/2002 | Otani | ..................... | G03B 13/02 396/51 |

(Continued)

FOREIGN PATENT DOCUMENTS

JP H05161054 A 6/1993

*Primary Examiner* — Pritham D Prabhakher
(74) *Attorney, Agent, or Firm* — Rossi, Kimms & McDowell LLP (57) ABSTRACT

An image-capturing control apparatus according to the present invention includes: a line-of-sight detection unit configured to detect a line-of-sight position that is a position input by a line-of-sight of a user who is looking into a viewfinder; and a control unit configured to during standby for moving-image recording, perform control to move an AF (autofocus) target position by tracking the line-of-sight position even in case the line-of-sight position does not satisfy a specific condition, during the moving-image recording, perform, in a case where the line-of-sight position does not satisfy the specific condition, control so as not to change the AF target position based on the line-of-sight position, and perform, in a case where the line-of-sight position satisfies the specific condition, control to change the AF target position on the basis of the line-of-sight position.

15 Claims, 5 Drawing Sheets

(56) References Cited

U.S. PATENT DOCUMENTS

| | | | |
|---|---|---|---|
| 2012/0013786 A1* | 1/2012 | Yasuda | H04N 5/232123 |
| | | | 348/349 |
| 2014/0015989 A1* | 1/2014 | Shibuno | G02B 7/36 |
| | | | 348/208.12 |
| 2014/0192211 A1* | 7/2014 | Konicek | H04N 5/23203 |
| | | | 348/207.1 |
| 2016/0283455 A1* | 9/2016 | Mardanbegi | G06F 3/038 |
| 2017/0024604 A1* | 1/2017 | Cho | G06V 40/19 |
| 2017/0026565 A1* | 1/2017 | Hong | H04N 5/23212 |
| 2017/0068081 A1* | 3/2017 | Hirayama | A61B 1/00149 |
| 2018/0198985 A1* | 7/2018 | Ishitsuka | H04N 5/232935 |
| 2019/0191101 A1* | 6/2019 | Ogawa | H04N 5/232941 |

\* cited by examiner

IMAGE-CAPTURING CONTROLLER AND METHOD FOR CONTROLLING SAME

BACKGROUND OF THE INVENTION

Field of the Invention

The present invention relates to an image-capturing control apparatus and a method for controlling the image-capturing control apparatus, and more particularly to an image-capturing control apparatus including an inputting unit for input by means of a line-of-sight and a method for controlling the image-capturing control apparatus.

Description of the Related Art

Conventionally, a VTR integrated with a camera is known that performs autofocus (AF) by tracking a position which a photographer gazes on.

Japanese Patent Application Publication No. H05-161054 discloses performing AF that uses, as the focus frame, an area determined by a minimum value and a maximum value of coordinates of gaze points detected in a certain time which varies depending on whether the focal length is closer to the wide end or to the telephoto end. The technique of the Japanese Patent Application Publication No. H05-161054 proposes preventing the AF control from becoming unstable due to the variation or deviation of gaze points that causes an excessive change in the focus point.

If the focus position changes significantly during capturing of a moving image, or if an unintended position is in focus, results therefrom may be recorded in a moving image. Unstable AF control is thus undesirable.

In particular, when AF is performed by tracking a line-of-sight, the AF control is likely to be unstable since a line-of-sight of a person rarely remains stable at the same position. The conventional technique disclosed by Japanese Patent Application Publication No. H05-161054 does not sufficiently solve this problem.

SUMMARY OF THE INVENTION

The present invention provides an image-capturing control apparatus capable of performing AF on a position based on a line-of-sight of a user and reducing the possibility of recording a moving image resulting from AF performed on a position different from the users intended position.

The image-capturing control apparatus according to the present invention includes: a line-of-sight detection unit configured to detect a line-of-sight position that is a position input by a line-of-sight of a user who is looking into a viewfinder; and a control unit configured to during standby for moving-image recording, perform control to move an AF (autofocus) target position by tracking the line-of-sight position even in case the line-of-sight position does not satisfy a specific condition, during the moving-image recording, perform, in a case where the line-of-sight position does not satisfy the specific condition, control so as not to change the AF target position based on the line-of-sight position, and perform, in a case where the line-of-sight position satisfies the specific condition, control to change the AF target position on the basis of the line-of-sight position.

Further features of the present invention will become apparent from the following description of exemplary embodiments with reference to the attached drawings.

DESCRIPTION OF THE EMBODIMENTS

First Embodiment

External View of Digital Camera

Figure 1A:
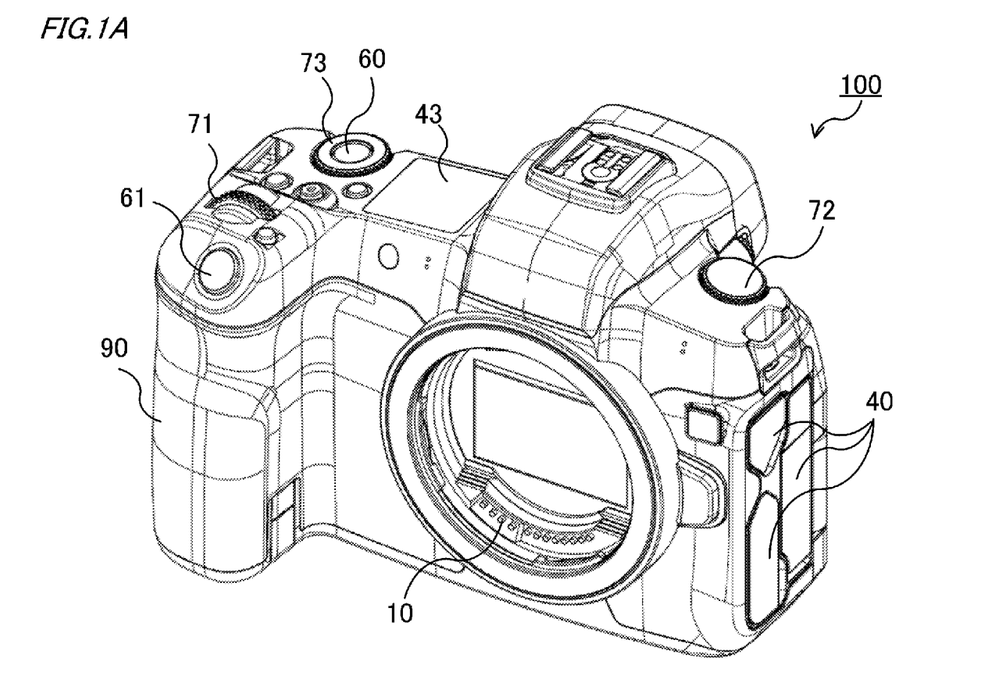
FIGS. 1A and 1B are external views of a digital camera.
Figure 1B:
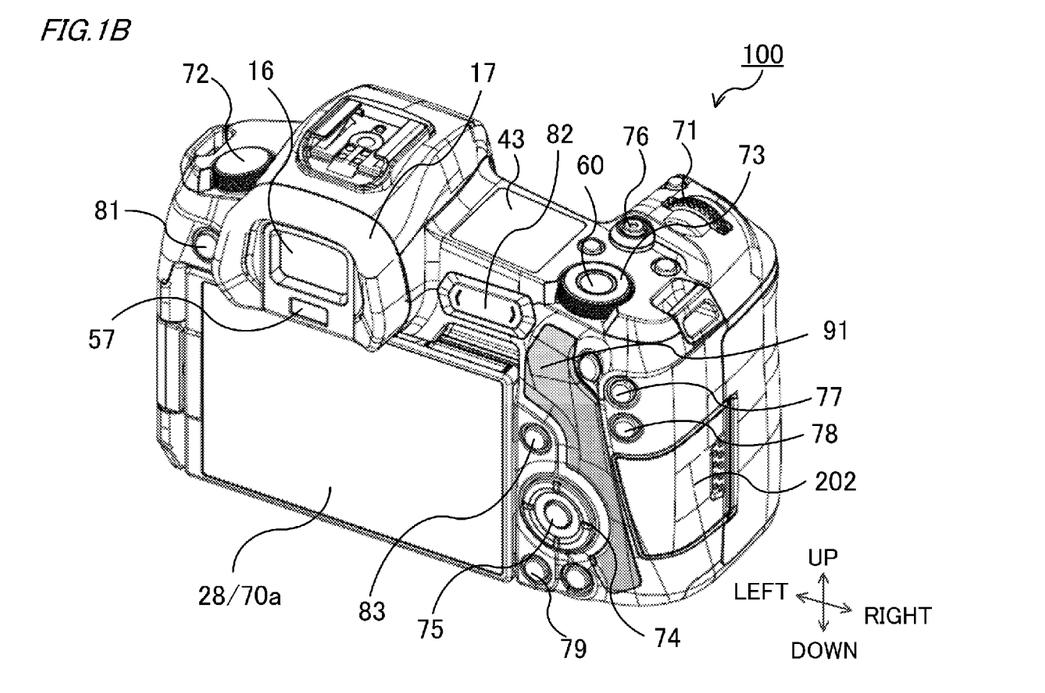

Preferred embodiments according to the present invention are now described with reference to the drawings. FIGS. 1A and 1B are external views of a digital camera 100 (image-capturing control apparatus) as an example of a device (electronic device) to which the present invention is applicable. FIG. 1A is a front perspective view of the digital camera 100, and FIG. 1B is a back perspective view of the digital camera 100.

A display unit 28 is provided on the back side of the digital camera 100 and displays images and various types of information. A touch panel 70a can detect a touch operation on the display surface (touch operation surface) of the display unit 28. An extra-finder display unit 43 is provided on the upper side of the digital camera 100 and displays various setting values of the digital camera 100, such as a shutter speed and a diaphragm aperture. A shutter button 61 is an operation member for instructing the capturing of images. A mode changeover switch 60 is an operation member for switching between various modes. Terminal covers 40 protect connectors (not shown) to connection cables or the like that connect the digital camera 100 to external devices.

An electronic main dial 71 is a rotational operation member that is rotated to change setting values, such as a shutter speed and a diaphragm aperture. A power switch 72 is an operation member that switches the power of the digital camera 100 on and off. An electronic sub-dial 73 is a rotational operation member that is rotated to perform operations such as moving a selection frame (cursor) and image feeding.

A four-way key 74 includes upper, lower, left, and right portions that can be individually pressed to enable a process associated with the pressed portion of the four-way key 74. A SET button 75 is a push-button mainly used to confirm a selected item.

A moving-image button 76 is used for instructions to start or stop capturing (recording) of a moving image in moving-image capturing mode. An AE lock button 77 is a push-button. Pressing the AE lock button 77 in an image-capturing standby state fixes the exposure state. An enlargement button 78 is a button for switching an enlargement mode on and off in a live view display (LV display) in an image-capturing mode. By operating the electronic main dial 71 after switching on the enlargement mode, a live view image (LV image) can be enlarged or reduced. In a playback mode, the enlargement button 78 functions as a button for enlarging a playback image or increasing its enlargement ratio.

A playback button 79 is an operation button for switching between the image-capturing mode and the playback mode. Pressing the playback button 79 in the image-capturing mode changes the mode to the playback mode and displays the latest image among the images stored in a recording medium 200 (described below with reference to FIG. 2) on the display unit 28.

A menu button 81 is a push-button used for an instruction operation for displaying a menu screen. Pressing the menu button 81 displays on the display unit 28 the menu screen with which various settings can be performed. A user can intuitively perform various settings with the menu screen displayed on the display unit 28, the four-way key 74, and the SET button 75.

A touch bar 82 (multi-function bar or M-Fn bar) is a linear touch operation member (line touch sensor) capable of accepting touch operations. The touch bar 82 is arranged at a position where a touch operation can be performed on the touch bar 82 (where the touch bar 82 is touchable) with the thumb of the right hand while the grip portion 90 is held with the right hand (held with the little finger, ring finger, and middle finger of the right hand) such that the shutter button 61 can be pressed with the index finger of the right hand. That is, the touch bar 82 is arranged at a position where it can be operated by a user who looks into the viewfinder with an eye positioned at the eyepiece 16 and is in a position ready to press the shutter button 61 at any time (image-capturing position). The touch bar 82 is an accepting portion that can accept operations on the touch bar 82 such as a tap operation (an operation involving touching and then releasing the touch without movement within a predetermined time) and leftward and rightward slide operations (operations involving touching and then moving the touch position while maintaining the touch). The touch bar 82 is an operation member that differs from the touch panel 70a and does not have a display function.

A communication terminal 10 is used by the digital camera 100 to communicate with the lens side, which is attachable and detachable. An eyepiece 16 is an eyepiece of an eyepiece viewfinder 17 (a look-in viewfinder), and the user can visually check, via the eyepiece 16, an image displayed on an internal electronic viewfinder (EVF) 29. An eye-proximity detecting unit 57 is an eye-proximity detecting sensor that detects whether an eye of a user (photographer) is positioned at the eyepiece 16.

A lid 202 is a lid of a slot in which the recording medium 200 is stored. The grip portion 90 is a holding portion shaped to be readily gripped by the right hand of the user to hold the digital camera 100. The shutter button 61 and the electronic main dial 71 are arranged at positions where they are operable with the index finger of the right hand in a state of holding the digital camera 100 with the little finger, ring finger, and middle finger of the right hand gripping the grip portion 90. Additionally, the electronic sub-dial 73 and the touch bar 82 are arranged at positions where they are operable with the thumb of the right hand in the same state.

A thumb rest portion 91 (a thumb standby position) is a grip member provided on the back side of the digital camera 100. The thumb rest portion 91 is located at a position where the thumb of the right hand gripping the grip portion 90 can be readily placed while the right hand is not operating any operation members. The thumb rest portion 91 may be formed by a rubber member to enhance the holding force (grip feeling).

A line-of-sight confirmation button 83 is an operation member in an operation unit 70, and is a push-button used to instruct the confirmation or cancellation of selection of a subject based on the position of a line-of-sight pointer (line-of-sight position). The line-of-sight confirmation button 83 is arranged at a position where it can be easily operated while the user looks into the viewfinder 17 (while the eye is positioned at the eyepiece 16). That is, the line-of-sight confirmation button 83 is located at a position where it can be operated with the thumb of the right hand holding the grip portion 90.

Configuration Block Diagram of Digital Camera

Figure 2:
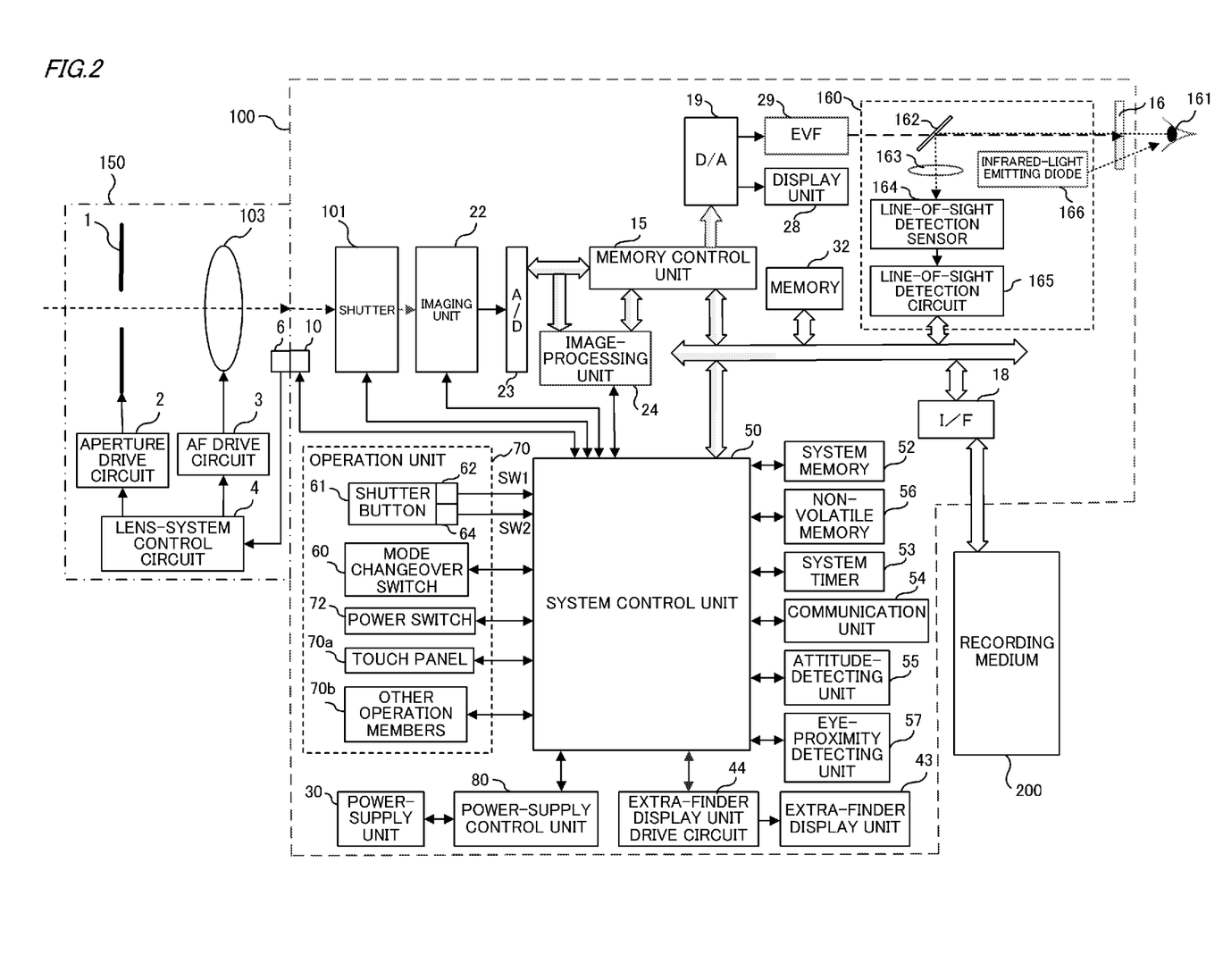
FIG. 2 is a block diagram showing an example of the configuration of the digital camera.

FIG. 2 is a block diagram showing a configuration example of the digital camera 100. The lens unit 150 includes replaceable photographing lenses. Lenses 103 usually consist of a plurality of lenses, but FIG. 2 simply shows them as one lens.

A communication terminal 6 is used by the lens unit 150 to communicate with the digital camera 100, and a communication terminal 10 is used by the digital camera 100 to communicate with the lens unit 150. The lens unit 150 communicates with a system control unit 50 via these communication terminals 6 and 10. The lens unit 150 includes a lens-system control circuit 4, which controls a diaphragm 1 via a diaphragm drive circuit 2. The lens-system control circuit 4 of the lens unit 150 also changes the position of the lens 103 via an AF drive circuit 3 for focusing.

A shutter 101 is a focal-plane shutter that can freely control the exposure time of an imaging unit 22 under the control of the system control unit 50.

The imaging unit 22 is an imaging element (image sensor), which may be a CCD or a CMOS, for converting an optical image into an electric signal. The imaging unit 22 may have an image-plane phase-detection sensor that outputs information on a defocusing amount to the system control unit 50. An A/D converter 23 converts an analog signal output from the imaging unit 22 into a digital signal.

An image-processing unit 24 performs predetermined processes (e.g., pixel interpolation, resizing such as reduction, and color conversion) on data received from the A/D converter 23 or data received from a memory control unit 15. The image-processing unit 24 also performs a predetermined calculation process using the captured image data. The system control unit 50 performs exposure control and distance measurement control based on the calculation result obtained by the image-processing unit 24. This allows for processing such as through-the-lens (TTL) autofocus (AF) processing, autoexposure (AE) processing, and pre-flashing (EF) processing. The image-processing unit 24 further performs a predetermined calculation process using the captured image data, and performs TTL auto white balance (AWB) processing based on the obtained calculation result.

The memory control unit 15 controls the data communication between the A/D converter 23, the image-processing unit 24, and the memory 32. The output data from the A/D converter 23 is written into a memory 32 via the image-processing unit 24 and the memory control unit 15. Alternatively, the output data from the A/D converter 23 is written into the memory 32 via the memory control unit 15 without going through the image-processing unit 24. The memory 32 stores the image data that is obtained by the imaging unit 22 and converted into digital data by the A/D converter 23, and the image data to be displayed on the display unit 28 and the EVF 29. The memory 32 has a storage capacity sufficient to store a predetermined number of still images, and moving images and audio of predetermined durations.

The memory 32 also serves as a memory for displaying images (video memory). A D/A converter 19 converts image display data stored in the memory 32 into analog signals and feeds the signals to the display unit 28 and the EVF 29. The image data for display written in the memory 32 is thus displayed on the display unit 28 and the EVF 29 via the D/A converter 19. Each of the display unit 28 and the EVF 29 is a display, such as an LCD or an organic EL, and displays images according to the analog signal received from the D/A converter 19. Digital signals that have been subjected to A/D conversion by the A/D converter 23 and accumulated in the memory 32 are converted into analog signals by the D/A converter 19 and sequentially transferred to the display unit 28 or the EVF 29 to be displayed, thereby achieving live view display (LV display). Hereinafter, an image displayed in the live view display is referred to as a live view image (LV image).

The system control unit 50 is a control unit including at least one processor or circuit and controls the entire digital camera 100. The system control unit 50 performs processes of the present embodiment, which will be described below, by executing a program recorded in a non-volatile memory 56. The system control unit 50 also performs display control by controlling the memory 32, the D/A converter 19, the display unit 28, and the EVF 29, for example.

A system memory 52 may be a RAM, and the system control unit 50 loads data such as the constants and variables for the operation of the system control unit 50 and a program read from the non-volatile memory 56 in the system memory 52.

The non-volatile memory 56 is a memory that is electrically erasable and recordable, such as an EEPROM. The non-volatile memory 56 records constants, a program, and other data for the operation of the system control unit 50. The program is used to perform the process of a flowchart of the present embodiment, which will be described below.

A system timer 53 is a time-measuring unit that measures time used for various controls and the time of the built-in clock.

A communication unit 54 transmits and receives video signals and audio signals to and from an external device connected wirelessly or by cable. The communication unit 54 can also be connected to a wireless local area network (LAN) and the Internet. Additionally, the communication unit 54 can also communicate with an external device via Bluetooth (registered trademark) or Bluetooth Low Energy. The communication unit 54 can transmit images (including LV images) captured by the imaging unit 22 and images recorded on the recording medium 200, and can receive image data and various other types of information from external devices.

An attitude-detecting unit 55 detects the attitude of the digital camera 100 relative to the direction of gravitational force. Based on the attitude detected by the attitude-detecting unit 55, a determination can be made as to whether an image captured by the imaging unit 22 is an image captured while holding the digital camera 100 horizontally or an image captured while holding the digital camera 100 vertically. The system control unit 50 can add information on the direction corresponding to the attitude detected by the attitude-detecting unit 55 to the image file of the image captured by the imaging unit 22 and record a rotated version of the image. The attitude-detecting unit 55 may be an acceleration sensor or a gyro sensor, for example. A motion of the digital camera 100 (such as pan, tilt, lift, or whether it is stationary) can be detected with the acceleration sensor or the gyro sensor serving as the attitude-detecting unit 55.

The eye-proximity detecting unit 57 is an eye-proximity detecting sensor that detects (approach detection) an approach (eye approach) and a separation (eye separation) of an eye (object) 161 with respect to the eyepiece 16 of the eyepiece viewfinder 17 (hereinafter, simply referred to as a "viewfinder"). The system control unit 50 switches between display (displayed state) and hide (hidden state) of the display unit 28 and the EVF 29 in accordance with the state detected by the eye-proximity detecting unit 57. Specifically, when a current state is at least the image-capturing standby state and the display destination is to be automatically switched, while an eye approach is not detected, the display unit 28 is set as the display destination and its display is turned on, and the EVF 29 is hidden. While an eye approach is detected, the EVF 29 is set as the display destination and its display is turned on, and the display unit 28 is hidden.

The eye-proximity detecting unit 57 may be an infrared proximity sensor that is capable of detecting an approach of any object toward the eyepiece 16 of the viewfinder 17 incorporating the EVF 29. When an object approaches, infrared light projected from a light-projecting unit (not shown) of the eye-proximity detecting unit 57 are reflected on the object and received by a light-receiving unit (not shown) of the infrared proximity sensor. It is also possible to determine how close the object is to the eyepiece 16 (eye-proximity distance) based on the amount of infrared light received. In this manner, the eye-proximity detecting unit 57 performs eye-approach detection that detects a distance of approach of an object with respect to the eyepiece 16.

In a state in which an eye approach is not detected (non-approach state), an eye approach is detected when an approaching object is detected within a predetermined distance to the eyepiece 16. In a state in which an eye approach is detected (approach state), an eye separation is detected when the object that has been detected in proximity is moved away by at least the predetermined distance. A threshold for detecting an eye approach and a threshold for detecting an eye separation may differ from each other by, for example, setting a hysteresis. After an eye approach is detected, it is assumed that a state in which an eye approach is detected is maintained until an eye separation is detected. After an eye separation is detected, it is assumed that a state in which an eye separation is detected is maintained until an eye approach is detected. An infrared proximity sensor is merely an example, and the eye-proximity detecting unit 57 may be other sensors capable of detecting approach of an eye or an object that can be considered as an eye approach.

Various setting values of the camera including a shutter speed and a diaphragm aperture are displayed on the extra-finder display unit 43 via an extra-finder display unit drive circuit 44.

A power-supply control unit 80 includes components such as a battery-detecting circuit, a DC-DC converter, and a switching circuit for switching between blocks to be energized, and detects whether a battery is mounted, a type of the battery, a remaining battery level, and the like. Additionally, the power-supply control unit 80 controls the DC-DC converter based on detection results thereof and an instruction from the system control unit 50 and supplies respective units, including the recording medium 200, with necessary voltage for a necessary period of time. A power-supply unit 30 may include a primary battery, such as an alkaline battery or a lithium battery, a secondary battery, such as a NiCd battery, a NiMFH battery, or a Li battery, or an AC adapter.

A recording medium I/F 18 is an interface with the recording medium 200, which may be a memory card or a hard disk. The recording medium 200 may be a memory card for recording captured images and include a semiconductor memory or a magnetic disk, for example.

An operation unit 70 is an input unit for accepting an operation by a user (user operation) and is used to input various operation instructions to the system control unit 50. As shown in FIG. 2, the operation unit 70 may include the shutter button 61, the mode changeover switch 60, the power switch 72, the touch panel 70a, and other operation members 70b. The other operation members 70b may include the electronic main dial 71, the electronic sub-dial 73, the four-way key 74, and the SET button 75. The other operation members 70b may also include the moving-image button 76, the AE lock button 77, the enlargement button 78, the playback button 79, the menu button 81, the touch bar 82, and the line-of-sight confirmation button 83.

The shutter button 61 includes a first shutter switch 62 and a second shutter switch 64. The first shutter switch 62 is turned on during an operation of the shutter button 61 by a half-press (image-capturing preparation instruction) and generates a first shutter switch signal SW1. In response to the first shutter switch signal SW1, the system control unit 50 starts image-capturing preparation operations of autofocus (AF) processing, autoexposure (AE) processing, auto white balance (AWB) processing, pre-flashing (EF) processing, and the like.

The second shutter switch 64 is turned on upon completion of an operation of the shutter button 61 by a full-press (image-capturing instruction) and generates a second shutter switch signal SW2. In response to the second shutter switch signal SW2, the system control unit 50 starts a series of operations of an image-capturing process from reading the signal from the imaging unit 22 to writing the captured image into the recording medium 200 as an image file.

The mode changeover switch 60 may switch the operation mode of the system control unit 50 to any of a still-image capturing mode, a moving-image capturing mode, and a playback mode. Modes included in the still-image capturing mode are an automatic capturing mode, an automatic scene determination mode, a manual mode, an aperture priority mode (Av mode), a shutter speed priority mode (Tv mode), and a program AE mode (P mode). Other available modes include various scene modes that constitute image-capturing settings for different image-capturing scenes, and a custom mode. The mode changeover switch 60 allows the user to directly switch to any of these modes. Alternatively, after temporarily switching to a list screen of the image-capturing modes using the mode changeover switch 60, another operation member may be used to selectively switch to any of a plurality of displayed modes. In a similar manner, the moving-image capturing mode may also include a plurality of modes.

The touch panel 70a is a touch sensor that can detect various touch operations on the display surface of the display unit 28 (the operation surface of the touch panel 70a). The touch panel 70a and the display unit 28 can be integrally configured. For example, the touch panel 70a is configured such that the transmittance of light does not obstruct the display by the display unit 28, and is mounted to the upper layer of the display surface of the display unit 28. Then, input coordinates on the touch panel 70a and display coordinates on the display surface of the display unit 28 are associated with each other. This provides a graphical user interface (GUI) that allows the user to feel as if a screen displayed on the display unit 28 can be directly manipulated.

A line-of-sight detection block 160 detects a line-of-sight of a user at the eyepiece 16. The line-of-sight detection block 160 includes a dichroic mirror 162, an image-forming lens 163, a line-of-sight detection sensor 164, an infrared-light emitting diode 166, and a line-of-sight detection circuit 165.

The infrared-light emitting diode 166 is a light-emitting element for detecting a line-of-sight position of the user on the viewfinder screen, and irradiates the user's eyeball (eye) 161 with infrared light. The infrared light emitted from the infrared-light emitting diode 166 is reflected on the eyeball (eye) 161, and the reflected infrared light reaches the dichroic mirror 162. The dichroic mirror 162 reflects only infrared light and transmits visible light. The reflected infrared light whose optical path has been changed is imaged on the image plane of the line-of-sight detection sensor 164 via the image-forming lens 163. The image-forming lens 163 is an optical member that constitutes a line-of-sight detection optical system. The line-of-sight detection sensor 164 includes an imaging device such as a CCD image sensor.

The line-of-sight detection sensor 164 photoelectrically converts the incident reflected infrared light into an electric signal and outputs it to the line-of-sight detection circuit 165. The line-of-sight detection circuit 165 detects the user's line-of-sight position from the movement of the user's eyeball (eye) 161 based on the output signal from the line-of-sight detection sensor 164, and outputs the detection information to the system control unit 50.

The line-of-sight detection block 160 may detect a line-of-sight by a method called pupil center corneal reflection, for example. The pupil center corneal reflection method detects the direction and position of a line-of-sight based on the positional relationship between the reflected infrared light that is emitted from the infrared-light emitting diode 166 and reflected mainly on the cornea of the eyeball (eye) 161, and the pupil of the eyeball (eye) 161. The method of detecting the direction and position of a line-of-sight is not limited to the pupil center corneal reflection method, and there are various other methods such as the limbus tracking method that uses the difference in light reflectance between the pupil and the white of the eye. Instead of the methods described above, the line-of-sight detection block 160 may use any method that can detect the direction and position of a line-of-sight.

The light-projecting unit and the light-receiving unit of the eye-proximity detecting unit 57 may be devices provided separately from the infrared-light emitting diode 166 and the line-of-sight detection sensor 164. However, the infrared-light emitting diode 166 may double as the light-projecting unit of the eye-proximity detecting unit 57. Furthermore, the line-of-sight detection sensor 164 may double as the light-receiving unit.

The system control unit 50 can detect the following operations or states relating to the eyepiece 16, based on the output from the line-of-sight detection block 160 or the eye-proximity detecting unit 57.

The line-of-sight that has not been directed at the eyepiece 16 is newly directed at the eyepiece 16. That is, a line-of-sight input is started.

A line-of-sight is input to the eyepiece 16.

The eyepiece 16 is gazed at.

The line-of-sight that has been directed at the eyepiece 16 is removed. That is, the line-of-sight input is ended.

A state in which no line-of-sight is input to the eyepiece 16.

The "gazing" used herein refers to a situation in which the user keeps looking at substantially the same position for some time. In one example of gaze determination, the user is determined to be gazing when the line-of-sight position of the user moves only within a predetermined movement amount for a predetermined time (e.g., about 0.5 seconds).

The predetermined time may be set by the user or may be a preset time. For example, based on the detection information received from the line-of-sight detection circuit 165, the system control unit 50 measures the duration of a state in which the user's line-of-sight is detected at substantially the same position (state without line-of-sight movements). The system control unit 50 determines that the user is gazing when the duration of the state without line-of-sight movements exceeds a predetermined time (threshold time).

In another example, the distance between the last line-of-sight position and the current line-of-sight position may be used to determine whether the user is gazing. For example, the system control unit 50 calculates the average position and the variation (dispersion) of the line-of-sight positions detected in the threshold time including the last detection timing. The system control unit 50 may determine the state of gazing (state without line-of-sight movements) when the average position of the detected positions is within a predetermined range from the current line-of-sight position and also the variation (dispersion) is less than a predetermined value.

AF-Target-Position Change Process

Figure 3:
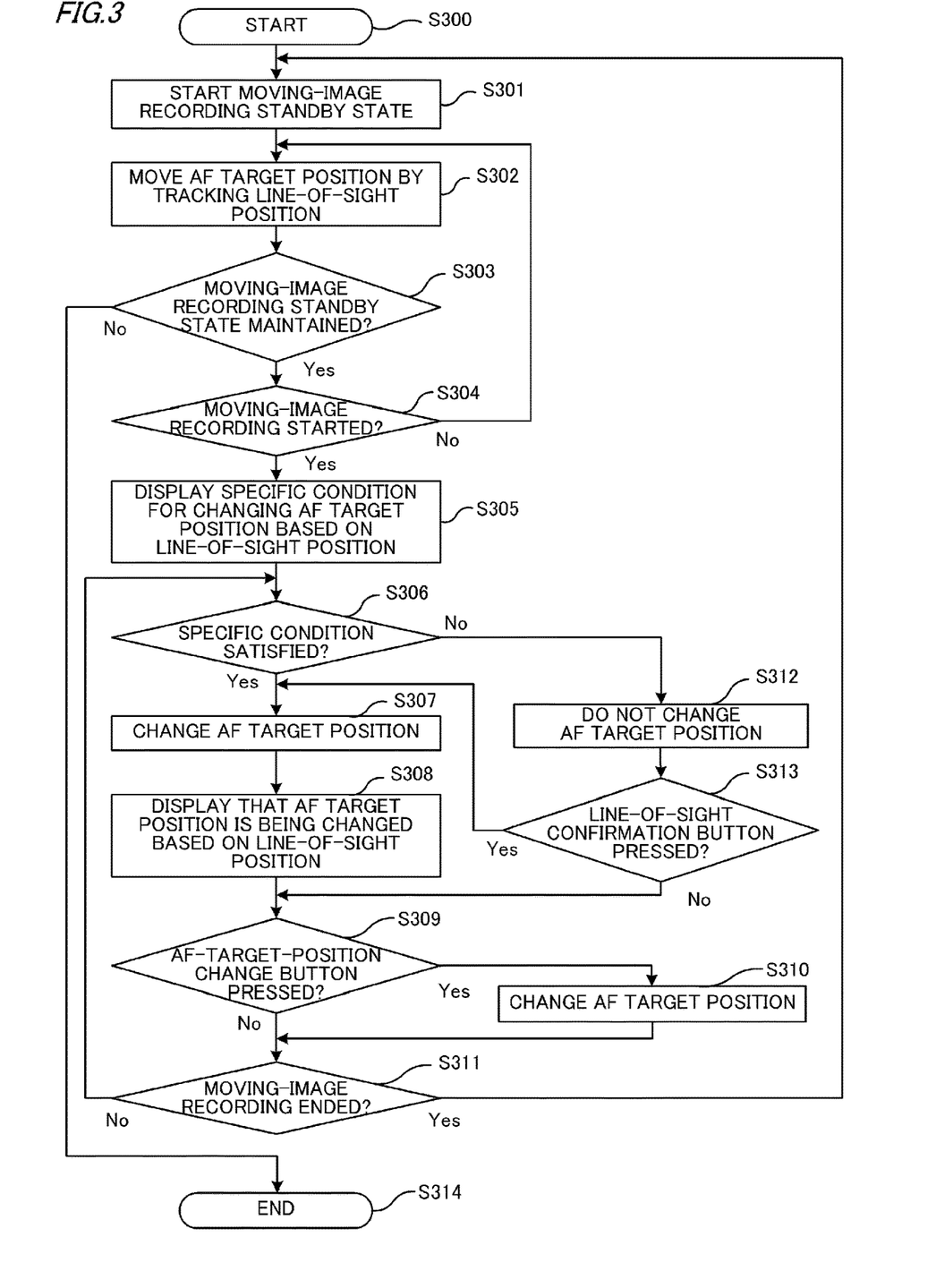
FIG. 3 is a flowchart illustrating an AF-target-position change process in moving-image capturing.

Referring to FIGS. 3 and 4A to 4F, the process of changing the target position (AF target position) of an AF process (AF operation) in moving-image capturing with the digital camera 100 is now described. The digital camera 100 performs an AF operation that keeps focusing on a subject when the AF target position is changed or set. FIG. 3 is a flowchart illustrating an example of AF-target-position change process in moving-image capturing. FIGS. 4A to 4F are diagrams showing display examples of the intra-finder display unit (EVF 29). The process of the flowchart of FIG. 3 is performed when a program recorded in the non-volatile memory 56 is loaded into the system memory 52 and executed by the system control unit 50.

At S300, the system control unit 50 starts a process of moving-image capturing mode of the digital camera 100. The process from S301 to S304 is a process of the digital camera 100 during standby for moving-image recording. The process from S305 to S313 is a process of the digital camera 100 during moving-image recording.

At S301, the system control unit 50 starts a moving-image recording standby state of the digital camera 100. The system control unit 50 performs live view display (LV display) by sequentially displaying the images captured by the imaging unit 22 on the EVF 29 (the intra-finder display unit). In this state, the photographer (user) can look at subjects on the intra-finder display unit through the LV display of the captured images.

At S302, the system control unit 50 detects the photographer's line-of-sight position with the line-of-sight detection block 160. The line-of-sight position is a position input by a line-of-sight of the photographer (user). The system control unit 50 performs an AF operation by moving the AF target position by tracking the detected line-of-sight position. The AF operation in this example is continuous AF in which AF is continuously performed on the subject at the AF target position.

Figure 4A:
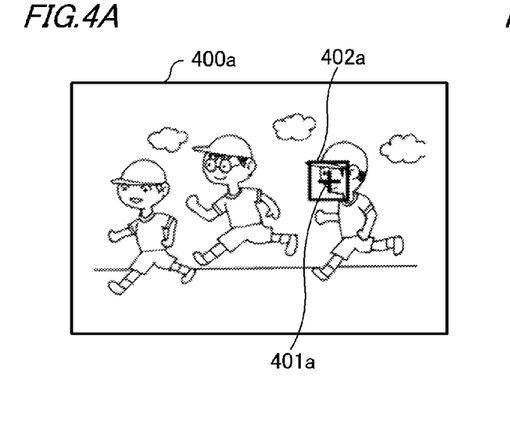
FIGS. 4A to 4F are diagrams showing display examples of an intra-finder display unit.
Figure 4B:
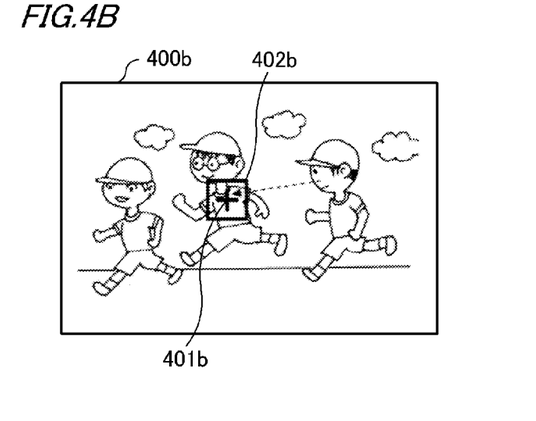

Referring to FIGS. 4A and 4B, a display example (screen) of the EVF 29 is now described in which the AF target position moves by tracking the line-of-sight position. FIG. 4A shows a screen 400a in which the AF target position 402a coincides with the photographer's line-of-sight position 401a. FIG. 4B shows a screen 400b in which the photographer's line-of-sight position 401a in FIG. 4A moves to another subject. On the screen 400b, the photographer's line-of-sight has moved to the line-of-sight position 401b. The AF target position moves to the AF target position 402b by tracking the line-of-sight position 401b.

In the moving-image recording standby state, the system control unit 50 immediately changes the AF target position by tracking the movement of the line-of-sight position and performs an AF process even if the condition at S306 described below is not satisfied. This allows for quick focusing on the line-of-sight position. The system control unit 50 may move the AF target position to the line-of-sight position on condition that the photographer gazes for some time. That is, the system control unit 50 may change the AF target position based on the line-of-sight position when a state in which the line-of-sight position is at a position different from the AF target position continues for at least a predetermined time. Nevertheless, the predetermined time used in this case should be shorter than the fixed time that is the threshold value used at S306, which will be described below. That is, in the moving-image recording standby state, the condition for changing the AF target position by tracking the line-of-sight position is less strict than that used at S306.

At S303, the system control unit 50 determines whether the moving-image recording standby state is maintained. The system control unit 50 may determine that the moving-image recording standby state is not maintained when the photographer turns off the power switch 72 or switches the mode, for example. If the moving-image recording standby state is maintained, the process proceeds to S304. If the moving-image recording standby state is not maintained, the process proceeds to S314, and the process of the digital camera 100 illustrated in FIG. 3 ends.

At S304, the system control unit 50 determines whether moving-image recording has started. For example, the system control unit 50 may determine that the moving-image recording has started when the moving-image button 76 is pressed by an operation of the photographer. If moving-image recording has started, the process proceeds to S305. If moving-image recording has not started, the process returns to S302.

Figure 4C:
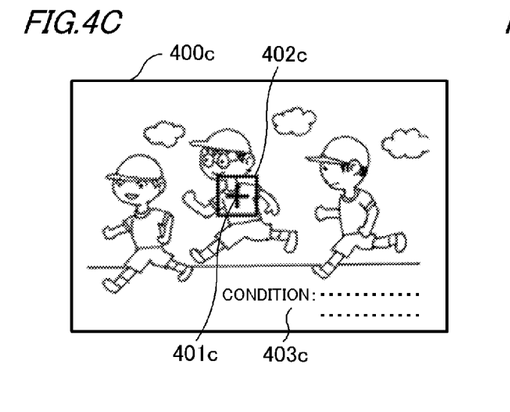

At S305, the system control unit 50 displays on the EVF 29 a message indicating that the AF target position is to be controlled to be changed based on the line-of-sight position when the line-of-sight position satisfies a specific condition. FIG. 4C is a display example in which a message is displayed on the EVF 29 indicating a specific condition for changing the AF target position based on the line-of-sight position. For example, the system control unit 50 displays on a screen 400c a message 403c of ""AF target position: Condition for tracking the line-of-sight position" A predetermined state in which the photographer's line-of-sight position is different from the AF target position continues for at least a fixed time". The message 403c may be displayed, for example, at the start of moving-image recording or during moving-image recording. The details of the specific condition will be described in the following description of S306.

At S306, the system control unit 50 determines whether the specific condition is satisfied. The specific condition may be "a predetermined state in which the photographer's line-of-sight position is different from the AF target position continues for at least a fixed time", for example. The fixed time (first time) may be a time period preset in the digital camera 100 (for example, 0.5 seconds), or may be a time period set by the photographer with the operation unit 70. The predetermined state is a state for determining whether the specific condition is satisfied, and a plurality of states can be set.

Figure 4D:
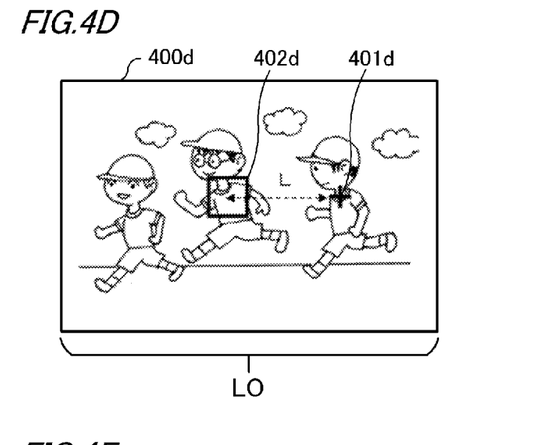

Referring to FIG. 4D, specific examples of the predetermined state are now described. The first example of the predetermined state is a state in which the apparent distance L (on a screen 400d) between the line-of-sight position 401d and the AF target position 402d is at least a predetermined distance L1 as shown in FIG. 4D. The predetermined distance L1 (first distance) may be a distance set in the digital camera 100 (for example, a length of 1/10 of the width L0 of the screen 400d, which is the image plane), or a distance set by the photographer with the operation unit 70.

The second example of the predetermined state is a state in which the line-of-sight position 401d is fixed at the same position, or the photographer gazes at the same subject, regardless of whether the distance L between the line-of-sight position 401d and the AF target position 402d is at least the predetermined distance L1.

In the determination at S306, the system control unit 50 determines that the line-of-sight position satisfies the specific condition when the predetermined state continues for at least the fixed time. The situation in which the predetermined state continues for at least the fixed time may be a situation in which one of the predetermined states described above continues for at least the fixed time, or a situation in which a plurality of predetermined states continues for the fixed time or more. That is, the system control unit 50 may determine that the line-of-sight position satisfies the specific condition when at least one of a plurality of predetermined states continues. If the specific condition is satisfied, the process proceeds to S307 (Case 2). If the specific condition is not satisfied, the process proceeds to S312 (Case 1).

At S307 (Case 2), the system control unit 50 changes the AF target position by tracking the photographer's line-of-sight position detected by the line-of-sight detection block 160, and performs an AF operation.

Figure 4E:
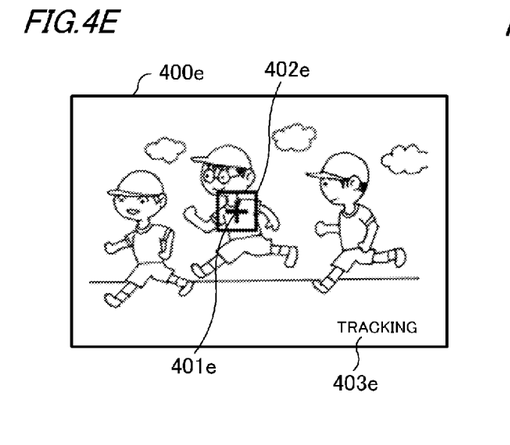

At S308, the system control unit 50 indicates on the EVF 29 that the AF target position is being changed based on the line-of-sight position (tracking). FIG. 4E shows a display example indicating on the EVF 29 that the tracking is in progress. For example, the system control unit 50 may display "Tracking" or ""Line-of-sight position—AF target position" Tracking" on the screen 400e as display 403e indicating that tracking is in progress.

At S309, the system control unit 50 determines whether an AF-target-position change button is pressed by the photographer. In the digital camera 100, the four-way key 74, for example, may function as the AF-target-position change button. The AF-target-position change button corresponds to a first operation member. If the AF-target-position change button is pressed, the process proceeds to S310. If the AF-target-position change button is not pressed, the process proceeds to S31.

At S310, the system control unit 50 changes the AF target position based on the operation on the AF-target-position change button (the four-way key 74) by the photographer and the photographer's line-of-sight position detected at the time point when the AF-target-position change button is pressed. Functions of changing (moving) the AF target position upward, downward, leftward, and rightward may be assigned to the four directions of up, down, left, and right, respectively, of the four-way key 74. For example, when the four-way key 74 is pressed at S309, the AF target position may be moved in the direction of the pressing by a predetermined distance, or moved to a subject that is located in the direction of the pressing from the AF target position detected at the time point of the pressing.

Figure 4F:
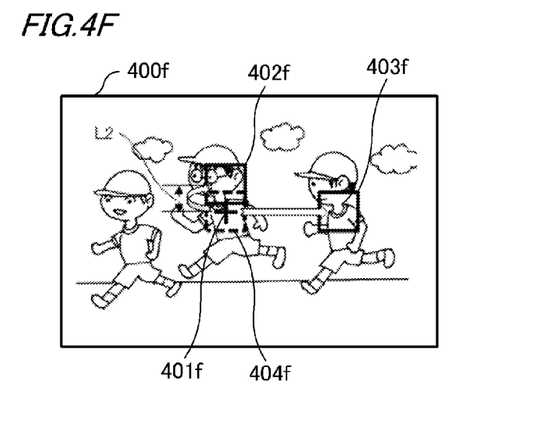

Referring to FIG. 4F, a specific example of changing the AF target position is now described. FIG. 4F is a display example of the EVF 29 in which the AF target position is moved in response to an operation on the AF-target-position change button (the four-way key 74).

When the upper side of the four-way key 74 is pressed at S309, the system control unit 50 moves the current AF target position 404f to an upward AF target position 402f regardless of the line-of-sight position 401f. The moving distance may be a predetermined distance L2, which is preset. The predetermined distance L2 may also be set by the photographer.

If the right side of the four-way key 74 is pressed at S309, the system control unit 50 moves the current AF target position 404f to an AF target position 403f on a rightward subject regardless of the line-of-sight position 401f. In this manner, when a subject is present in the direction in which the photographer presses the four-way key 74, the system control unit 50 may move the AF target position to a subject present in the direction in which the four-way key 74 is pressed, instead of moving the current AF target position by the predetermined distance L2.

At S311, the system control unit 50 determines whether the moving-image recording has ended. The system control unit 50 may determine that the moving-image recording has ended when the moving-image button 76 has been pressed by an operation of the photographer, for example. When the moving-image recording has ended, the process proceeds to S301, and the moving-image recording standby state is set. If the moving-image recording has not ended, the process returns to S306.

At S312 (Case 1), the system control unit 50 performs an AF operation without changing the AF target position by tracking the photographer's line-of-sight position detected by the line-of-sight detection block 160. In this case, the AF target position may be set so as to automatically track the subject, or may be set so as not to track the subject or move. The setting of tracking the subject is useful when the subject is a moving object, and the setting of not tracking is useful when the subject does not move. At S312, the system control unit 50 continues to display on the EVF 29 the message 403c regarding the specific condition described with S305.

At S313, the system control unit 50 determines whether the line-of-sight confirmation button 83 (second operation member) is pressed by the photographer. If the line-of-sight confirmation button 83 is pressed, the process proceeds to S307. If the line-of-sight confirmation button 83 is not pressed, the process proceeds to S309. When the line-of-sight confirmation button 83 is pressed, the system control unit 50 changes the AF target position at S307 based on the line-of-sight position detected at the time point when the line-of-sight confirmation button 83 is pressed.

Advantages of First Embodiment

As described above, during standby for moving-image recording, the system control unit 50 changes the AF target position by tracking the photographer's line-of-sight position. This enables immediate response to the photographer's intention of changing the AF target position.

During the moving-image recording, the system control unit 50 determines whether the specific condition is satisfied, before changing the AF target position. The system control unit 50 is thus capable of changing the AF target position as intended by the photographer. That is, when the specific condition is satisfied (Case 2), the system control unit 50 changes the AF target position by tracking the line-of-sight position of the photographer, enabling immediate response to the photographer's intention of changing the AF target position. When the specific condition is not satisfied (Case 1), the system control unit 50 does not change the AF target position by tracking the photographer's line-of-sight position. As such, the AF target position is less likely to be changed by a change in the line-of-sight position that is made unintentionally by the photographer (for example, when the line-of-sight position moves to another subject only for a moment).

As described with S313, even in case the specific condition is not satisfied (Case 1), pressing the line-of-sight confirmation button 83 causes the system control unit 50 to change the AF target position by tracking the photographer's line-of-sight position. This enables immediate response to the photographer's intention of changing the AF target position.

As described with S309 and S310, when the four-way key 74 is pressed during moving-image recording (Cases 1 and 2), the system control unit 50 changes the AF target position according to the direction of pressing. This enables immediate response to the photographer's intention of changing the AF target position.

The above-mentioned "specific condition" and "predetermined state" are not limited to the specific conditions and predetermined states described as examples in the present embodiment, and other conditions and states within the scope of the present discloser may be used. For example, the system control unit 50 may determine that the specific condition is satisfied when the predetermined state is established even if the predetermined state does not continue for at least the fixed time. In addition to the two examples described above, the predetermined state may be other states, such as a state in which the line-of-sight position is not stable at the same position, or a state in which the photographer gazes at a position where a subject is not present.

Second Embodiment

The first embodiment relates to a process of changing the AF target position in moving-image capturing mode. In contrast, the second embodiment relates to a process of changing the AF target position in still-image capturing mode.

AF-Target-Position Change Process

Figure 5:
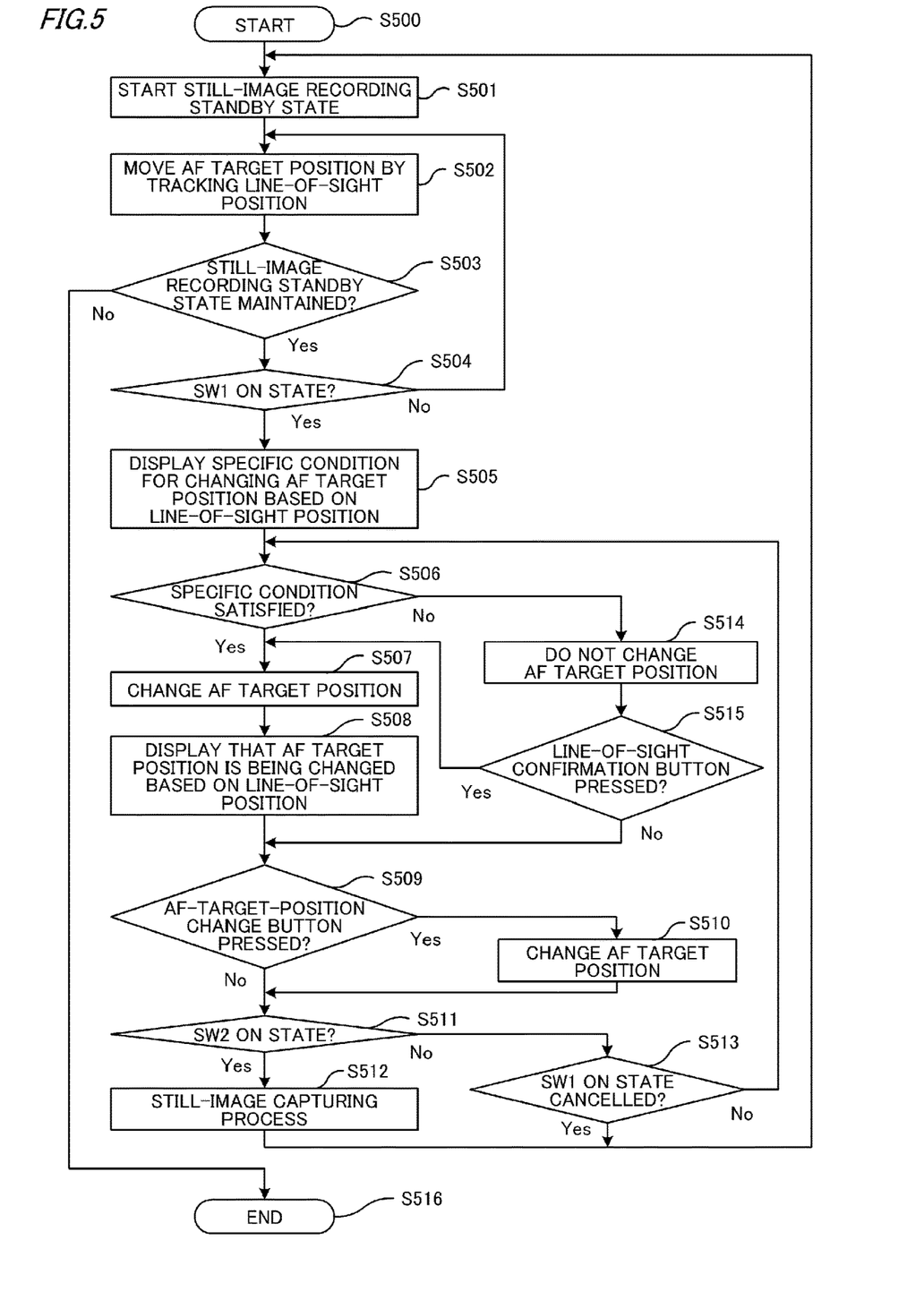
FIG. 5 is a flowchart illustrating an AF-target-position change process in still-image capturing.

Referring to FIG. 5, the process of changing the AF target position in still-image capturing with the digital camera 100 is now described. The digital camera 100 performs an AF operation that keeps focusing on a subject when the AF target position is changed or set. FIG. 5 is a flowchart illustrating an AF-target-position change process in still-image capturing. The process of the flowchart of FIG. 5 is performed when a program recorded in the non-volatile memory 56 is loaded into the system memory 52 and executed by the system control unit 50.

At S500, the system control unit 50 starts the process of still-image capturing mode of the digital camera 100. The process from S501 to S504 is a process of the digital camera 100 performed when there is no instruction through the image-capturing instruction unit (the shutter button 61). The process from S505 to S515 is a process of the digital camera 100 performed when there is an instruction through image-capturing instruction unit.

The instruction (operation) through the shutter button 61 is a two-step operation including a first operation for instructing preparation for still-image capturing and a second operation for instructing still-image capturing. The first operation is an operation of pressing the shutter button 61 halfway, that is, an operation of setting the first shutter switch 62 (SW1) in ON state. The second operation is an operation of fully pressing the shutter button 61, that is, an operation of setting the second shutter switch 64 (SW2) in ON state.

At S501, the system control unit 50 starts a still-image recording standby state of the digital camera 100. The system control unit 50 performs the same process as S301 described with reference to FIG. 3 of the first embodiment. At S502, the system control unit 50 performs an AF operation by moving the AF target position by tracking the detected line-of-sight position in the same manner as S302.

At S503, the system control unit 50 determines whether the still-image recording standby state is maintained. The system control unit 50 may determine that the still-image recording standby state is not maintained when the photographer operates the power switch 72, for example. If the still-image recording standby state is maintained, the process proceeds to S504. If the still-image recording standby state is not maintained, the process proceeds to S516, and the process of the digital camera 100 shown in FIG. 5 ends.

At S504, the system control unit 50 determines whether the shutter button 61 is pressed halfway by an operation of the photographer (image-capturing preparation instruction), that is, whether the first shutter switch 62 (SW1) is in ON state. If SW1 is in ON state, the process proceeds to S505. If the SW1 is not in ON state (if it is in OFF state), the process returns to S502.

At S505 and S506, the system control unit 50 performs the same process as S305 and S306 described in the first embodiment. At S505, the system control unit 50 displays on the EVF 29 a message (the message 403c in FIG. 4C) indicating the specific condition for changing the AF target position based on the line-of-sight position, at the start of still-image capturing or during still-image capturing (during continuous capturing).

In the determination at S506, the system control unit 50 determines that the specific condition is satisfied when the predetermined state described in the first embodiment continues for at least the fixed time. If the specific condition is satisfied, the process proceeds to S507 (Case 2). If the specific condition is not satisfied, the process proceeds to S514 (Case 1).

At S507 (Case 2) to S510, the system control unit 50 performs the same process as S307 to S310 described with reference to FIG. 3 of the first embodiment.

At S511, the system control unit 50 determines whether the shutter button 61 is fully pressed by an operation of the photographer (image-capturing instruction), that is, whether the second shutter switch 64 (SW2) is in ON state. If SW2 is in ON state, the process proceeds to S512. If the SW2 is not in ON state (if it is in OFF state), the process proceeds to S513. At S512, the system control unit 50 performs a still-image capturing process.

At S513, the system control unit 50 determines whether the half-press on the shutter button 61 (image-capturing preparation instruction) is canceled by an operation of the photographer, that is, whether ON state of the first shutter switch 62 (SW1) is canceled. If ON state of SW1 is canceled, the process returns to S501. If ON state of SW1 is not canceled, the process returns to S506.

At S514 (Case 1) and S515, the system control unit 50 performs the same process as S312 and S313 described with reference to FIG. 3 of the first embodiment.

Advantage of Second Embodiment

As described above, during standby for still-image recording, the system control unit 50 changes the AF target position by tracking the photographer's line-of-sight position. This enables immediate response to the photographer's intention of changing the AF target position.

After still-image capturing preparation is performed (when the SW1 is in ON state), the system control unit 50 determines whether the specific condition is satisfied, before changing the AF target position. The system control unit 50 is thus capable of changing the AF target position as intended by the photographer. That is, when the specific condition is satisfied (Case 2), the AF target position is changed by tracking the photographer's line-of-sight position, enabling immediate response to the photographer's intention of changing the AF target position. When the specific condition is not satisfied (Case 1), the system control unit 50 does not change the AF target position by tracking the photographer's line-of-sight position. As such, the AF target position is less likely to be changed by a change in the line-of-sight position that is made unintentionally by the photographer (for example, when the line-of-sight position moves to another subject only for a moment).

The present invention is not limited to the preferred embodiments described above, and various modifications and variations can be made within the scope of the invention.

The various controls that are performed by the system control unit 50 in the foregoing description may be performed by a single piece of hardware. Alternatively, processes may be shared by a plurality of pieces of hardware (e.g., a plurality of processors and circuits) to control the entire device.

Some preferred embodiments of the present invention are described above in detail, but the present invention is not limited to these specific embodiments, and various embodiments within the scope of the present invention are also included in the present invention. The foregoing embodiments are merely illustrative embodiments of the present invention, and the embodiments may be combined as appropriate.

The foregoing embodiments are examples in which the present invention is applied to a digital camera (image-capturing control apparatus), but the present invention is not limited to these examples and is applicable to any image-capturing device or electronic device that can receive a line-of-sight input. For example, the present invention is applicable to personal computers, PDAs, mobile phones, portable image viewers, printer devices, digital photo frames, music players, game machines, electronic book readers, and video players. The present invention is also applicable to wearable devices such as head-mounted displays (HMDs), display devices (including projection devices), tablet terminals, smartphones, AI speakers, home appliances, in-vehicle devices, and medical devices.

Additionally, the present invention is applicable not only to the main body of an image-capturing device, but also to a control apparatus that communicates with an image-capturing device (including a network camera) wirelessly or by wire and remotely controls the image-capturing device. Examples of devices for remotely controlling an image-capturing device include smartphones, tablet PCs, and desktop PCs. Such a control apparatus can remotely control an image-capturing device by sending commands for various operations and settings to the image-capturing device based on operations and processes performed in the control apparatus. Furthermore, the control apparatus may be configured to receive the live view image captured by the image-capturing device via wired or wireless communication and display the image on the control apparatus.

The present invention allows AF to be performed on a position based on the line-of-sight of the user, and reduces the possibility that a moving image is recorded based on AF that is performed on a position different from the user's intended position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-054556, filed on Mar. 25, 2020, which is hereby incorporated by reference herein in its entirety.

What is claimed is:

1. An image-capturing control apparatus comprising:
a line-of-sight detector configured to detect a line-of-sight position that is a position input by a line-of-sight of a user who is looking into a viewfinder; and
at least one memory and at least one processor which function as:
a control unit configured to
during standby for moving-image recording,
perform control to move an AF (autofocus) target position by tracking the line-of-sight position even in case the line-of-sight position does not satisfy a specific condition,
during the moving-image recording,
perform, in a case where the line-of-sight position does not satisfy the specific condition, control so as not to change the AF target position based on the line-of-sight position, and
perform, in a case where the line-of-sight position satisfies the specific condition, control to change the AF target position on the basis of the line-of-sight position.

2. The image-capturing control apparatus according to claim 1, wherein in a case where an operation is performed on a first operation member during the moving-image recording, the AF target position is changed according to the operation.

3. The image-capturing control apparatus according to claim 1, wherein at a start of the moving-image recording or during the moving-image recording, a display unit in the viewfinder displays that control is to be performed to change the AF target position on the basis of the line-of-sight position in response to the line-of-sight position satisfying the specific condition.

4. The image-capturing control apparatus according to claim 1, wherein the specific condition is a condition under which a predetermined state, in which the line-of-sight position is at a position different from the AF target position, continues for at least a first time.

5. The image-capturing control apparatus according to claim 4, wherein the predetermined state is a state in which the line-of-sight position is separated from the AF target position by at least a first distance.

6. The image-capturing control apparatus according to claim 4, wherein the predetermined state is a state in which the line-of-sight position is fixed at a same position, or the user gazes at a same subject.

7. The image-capturing control apparatus according to claim 1, wherein AF control on the AF target position is continuous AF.

8. The image-capturing control apparatus according to claim 1, wherein in a case where the specific condition is not satisfied, the AF target position moves by tracking a subject.

9. The image-capturing control apparatus according to claim 1, wherein in a case where the specific condition is not satisfied, the AF target position does not move.

10. The image-capturing control apparatus according to claim 1, wherein in a case where the specific condition is not satisfied and a second operation member is operated, the AF target position is changed based on the line-of-sight position at a time point when the second operation member is operated.

11. The image-capturing control apparatus according to claim 1, wherein in a case where the line-of-sight position satisfies the specific condition, a display unit in the viewfinder displays that control is being performed to change the AF target position on the basis of the line-of-sight position.

12. An image-capturing control apparatus comprising:
a line-of-sight detector configured to detect a line-of-sight position that is a position input by a line-of-sight of a user who is looking into a viewfinder and
at least one memory and at least one processor which function as:
an instruction unit configured to instruct preparation for still-image capturing by a first step operation of a two-step operation, and to instruct still-image capturing by a second step operation of the two-step operation; and
a control unit configured to
while the first step operation by the instruction unit is not performed,
perform control to move an AF (autofocus) target position by tracking the line-of-sight position even in case the line-of-sight position does not satisfy a specific condition,
while the first step operation by the instruction unit is performed,
perform, in a case where the line-of-sight position does not satisfy the specific condition, control so as not to change the AF target position on the basis of the line-of-sight position, and
perform, in a case where the line-of-sight position satisfies the specific condition, control to change the AF target position based on the line-of-sight position.

13. The image-capturing control apparatus according to claim 12, wherein at a start of the still-image capturing or during the still-image capturing, a display unit in the viewfinder displays that control is to be performed to change the AF target position on the basis of the line-of-sight position in response to the line-of-sight position satisfying the specific condition.

14. A method for controlling an image-capturing control apparatus, the method comprising:
a line-of-sight detection step of detecting a line-of-sight position that is a position input by a line-of-sight of a user who is looking into a viewfinder; and
a control step of
during standby for moving-image recording,
performing control to move an AF (autofocus) target position by tracking the line-of-sight position even in case the line-of-sight position does not satisfy a specific condition;
during the moving-image recording
performing, in a case where the line-of-sight position does not satisfy the specific condition, control so as not to change the AF target position based on the line-of-sight position, and
performing, in a case where the line-of-sight position satisfies the specific condition, control to change the AF target position on the basis of the line-of-sight position.

15. A non-transitory computer-readable storage medium that stores a program for causing a computer to execute the steps of a method for controlling an image-capturing control apparatus, the method comprising:
a line-of-sight detection step of detecting a line-of-sight position that is a position input by a line-of-sight of a user who is looking into a viewfinder; and
a control step of
during standby for moving-image recording,
performing control to move an AF (autofocus) target position by tracking the line-of-sight position even in case the line-of-sight position does not satisfy a specific condition;
during the moving-image recording
performing, in a case where the line-of-sight position does not satisfy the specific condition, control so as not to change the AF target position based on the line-of-sight position, and
performing, in a case where the line-of-sight position satisfies the specific condition, control to change the AF target position on the basis of the line-of-sight position.

* * * * *